United States Patent
Terry et al.

(10) Patent No.: US 9,794,031 B2
(45) Date of Patent: *Oct. 17, 2017

(54) METHOD AND APPARATUS FOR IMPLEMENTING A DATA LIFESPAN TIMER FOR ENHANCED DEDICATED CHANNEL TRANSMISSIONS

(75) Inventors: Stephen E. Terry, Northport, NY (US); Guodong Zhang, Fármingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/652,082

(22) Filed: Jan. 5, 2010

(65) Prior Publication Data
US 2010/0113052 A1    May 6, 2010

Related U.S. Application Data

(63) Continuation of application No. 11/117,579, filed on Apr. 28, 2005, now Pat. No. 7,643,419.
(Continued)

(51) Int. Cl.
*H04W 72/04* (2009.01)
*H04L 1/18* (2006.01)
*H04L 1/16* (2006.01)

(52) U.S. Cl.
CPC .......... *H04L 1/1883* (2013.01); *H04L 1/1812* (2013.01); *H04L 1/1877* (2013.01); *H04L 1/1607* (2013.01)

(58) Field of Classification Search
None
See application file for complete search history.

(56) References Cited

U.S. PATENT DOCUMENTS

| 6,424,625 B1 | 7/2002 | Larsson et al. |
| 6,519,223 B1 | 2/2003 | Wager et al. |

(Continued)

FOREIGN PATENT DOCUMENTS

| EP | 1 447 943 | 8/2004 |
| EP | 1 838 057 | 9/2007 |

(Continued)

OTHER PUBLICATIONS

3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.
(Continued)

*Primary Examiner* — Rhonda Murphy
(74) *Attorney, Agent, or Firm* — Volpe and Koenig, P.C.

(57) ABSTRACT

A wireless communication system, which supports enhanced dedicated channel (E-DCH) data transmissions, includes a wireless transmit/receive unit (WTRU), at least one Node-B and a radio network controller (RNC). The WTRU includes a buffer, a data lifespan timer, a data retransmission counter, a hybrid-automatic repeat request (H-ARQ) process and a controller. The timer establishes a lifespan for at least one data block stored in the buffer. If physical resources have not been allocated for a data block associated with a lifespan timer that is close to expiration, the WTRU sends an urgent channel allocation request. If physical resources have been allocated, the data block is prioritized for transmission with respect to other data blocks. The data block is discarded if the lifespan timer expires or if the WTRU receives feedback information indicating that the data block was successfully received by the Node-B.

6 Claims, 2 Drawing Sheets

Related U.S. Application Data

(60) Provisional application No. 60/568,937, filed on May 7, 2004.

(56) References Cited

U.S. PATENT DOCUMENTS

| | | | |
|---|---|---|---|
| 6,628,946 B1 | 9/2003 | Wiberg et al. | |
| 6,901,063 B2 | 5/2005 | Vayanos et al. | |
| 6,952,411 B2* | 10/2005 | Sinnarajah et al. | 370/335 |
| 6,987,780 B2* | 1/2006 | Wei et al. | 370/469 |
| 7,061,913 B1 | 6/2006 | Abrol et al. | |
| 7,161,916 B2 | 1/2007 | Malladi et al. | |
| 7,164,904 B2* | 1/2007 | Nagy et al. | 455/403 |
| 7,197,313 B1 | 3/2007 | Sohn | |
| 7,260,401 B2 | 8/2007 | Chen et al. | |
| 7,301,988 B2 | 11/2007 | Kanterakis | |
| 7,366,477 B2 | 4/2008 | Sebire et al. | |
| 7,436,795 B2* | 10/2008 | Jiang | 370/328 |
| 7,436,834 B1* | 10/2008 | Zhang | H04L 1/1671 370/389 |
| 7,512,051 B2 | 3/2009 | Hayashi | |
| 7,545,765 B2* | 6/2009 | Larsson et al. | 370/328 |
| 2002/0015419 A1 | 2/2002 | Kim et al. | |
| 2002/0172208 A1 | 11/2002 | Malkamaki | |
| 2003/0095519 A1 | 5/2003 | Kuo et al. | |
| 2003/0112824 A1* | 6/2003 | Acosta | 370/474 |
| 2003/0123403 A1 | 7/2003 | Jiang | |
| 2003/0147348 A1 | 8/2003 | Jiang | |
| 2003/0210669 A1* | 11/2003 | Vayanos et al. | 370/335 |
| 2003/0214935 A1 | 11/2003 | Khan et al. | |
| 2004/0037224 A1 | 2/2004 | Choi et al. | |
| 2004/0037327 A1 | 2/2004 | Torsner et al. | |
| 2004/0156332 A1 | 8/2004 | Terry et al. | |
| 2004/0208160 A1* | 10/2004 | Petrovic | H04L 1/1835 370/350 |
| 2004/0252658 A1* | 12/2004 | Hosein et al. | 370/328 |
| 2005/0149470 A1 | 7/2005 | Fujie | |
| 2005/0207359 A1 | 9/2005 | Hwang et al. | |
| 2007/0008990 A1 | 1/2007 | Torsner | |
| 2013/0107837 A1* | 5/2013 | Terry | H04W 28/06 370/329 |

FOREIGN PATENT DOCUMENTS

| | | |
|---|---|---|
| JP | 10-056480 A2 | 2/1998 |
| JP | 11-331261 | 11/1999 |
| JP | 11331261 | 11/1999 |
| JP | 2001-197078 | 7/2001 |
| JP | 2003078565 A2 | 3/2003 |
| JP | 2003244087 A2 | 8/2003 |
| WO | 00/60799 | 10/2000 |
| WO | 0199353 A1 | 12/2001 |
| WO | 03/039074 | 5/2003 |
| WO | 03/058852 | 7/2003 |
| WO | 2004/049648 | 6/2004 |
| WO | 2004/073273 | 8/2004 |

OTHER PUBLICATIONS

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.
3GPP2 C.S0003-C, "Medium Access Control (MAC) Standard for cdma2000 Spread Spectrum Systems", 3rd Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.
Third Generation Partnership Project, "Technical Specification Group Radio Access Network; FDD Enhanced Uplink; Overall description; Stage 2 (Release 6)," 3GPP TS 25.309 V62.0 (Mar. 2005).
Third Generation Partnership Project, "Technical Specification Group Radio Access Network; Medium Access Control (MAC) protocol specification (Release 1999)," 3GPP TS 25.321 V3.16.0 (Sep. 2003).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.9.0 (Sep. 2003).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 6)," 3GPP TS 25.321 V6.1.0 (Mar. 2004).
Third Generation Partnership Project, "Technical Specification Group Radio Access Network; Medium Access Control (MAC) protocol specification (Release 6)," 3GPP TS 25.321 V6.4.0 (Mar. 2005).
Third Generation Partnership Project, "Technical Specification Group Radio Access Network; Medium Access Control (MAC) protocol specification (Release 5)," 3GPP TS 25.321 V5.8.0 (Mar. 2004).
Third Generation Partnership Project, "Technical Specification Group Radio Access Network; Medium Access Control (MAC) protocol specification (Release 5)," 3GPP TS 25.321 V5. 10.0 (Dec. 2004).
Third Generation Partnership Project, "Technical Specification Group Radio Access Network; Physical channels and mapping of transport channels onto physical channels (TDD) (Release 6)," 3GPP TS 25.221 V6.3.0 (Mar. 2005).
Third Generation Partnership Project, "Technical Specification Group Radio Access Network; Physical channels and mapping of transport channels onto physical channels (TDD) (Release 6)," 3GPP TS 25.221 V6.0.0 (Dec. 2003).
Third Generation Partnership Project, "Technical Specification Group Radio Access Network; Physical channels and mapping of transport channels onto physical channels (TDD) (Release 5)," 3GPP TS 25.221 V5.5.0 (Jun. 2003).
Third Generation Partnership Project, "Technical Specification Group Radio Access Network; Physical channels and mapping of transport channels onto physical channels (TDD) (Release 4)," 3GPP TS 25.221 V4.7.0 (Dec. 2002).
Third Generation Partnership Project, "Technical Specification Group Radio Access Network; Physical channels and mapping of transport channels onto physical channels (TDD) (Release 1999)," 3GPP TS 25.221 V3.11.0 (Sep. 2002).
3GPP2 C.S0004-C, "Signaling Link Access Control (LAC) Standard for cdma2000 Spread Spectrum System", 3rd Generation Partnershp Project 2 "3GPP2", Version 2.0, Revision C, Jul. 23, 2004.
Third Generation Partnership Project, "Technical Specification Group Radio Access Network; FDD Enhanced Uplink; Overall description; Stage 2 (Release 6)," 3GPP TS 25.309 V6.2.0 (Mar. 2005).
Third Generation Partnership Project, "Technical Specification Group Radio Access Network; Medium Access Control (MAC) protocol specification (Release 5)," 3GPP TS 25.321 V5.10.0 (Dec. 2004).
Motorola et al., "AH64: Text proposal for the TR—Section 7.5," 3GPPRAN1#31, R1-0359, Tokyo, Japan (Feb. 18-21, 2003).
Nokia, "Enhanced Uplink DCH," TSG-RAN WG1 #31 meeting, R1-03-0176, Tokyo, Japan (Feb. 18-21, 2003).

(56) References Cited

OTHER PUBLICATIONS

Samsung, "Relationship between scheduling and HARQ," 3GPP TSG-RAN WG1 #35 Meeting, R1-031224, Lisbon, Portugal (Nov. 17-21, 2003).

* cited by examiner

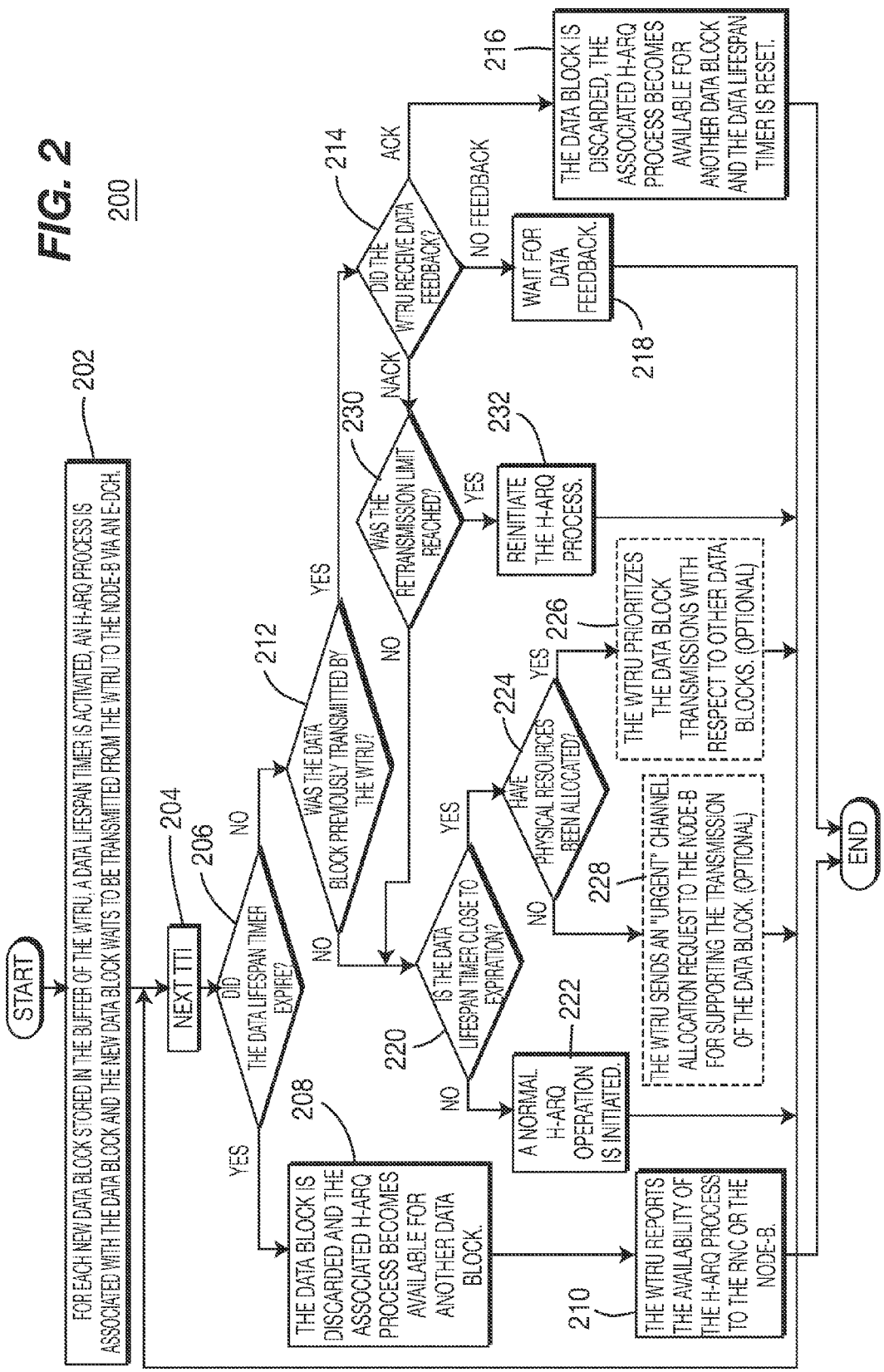

US 9,794,031 B2

METHOD AND APPARATUS FOR IMPLEMENTING A DATA LIFESPAN TIMER FOR ENHANCED DEDICATED CHANNEL TRANSMISSIONS

CROSS REFERENCE TO RELATED APPLICATION

This application is a continuation of U.S. patent application Ser. No. 11/117,579, filed Apr. 28, 2005, now U.S. Pat. No. 7,643,419, which claims the benefit of U.S. Provisional Application No. 60/568,937, filed May 7, 2004, which applications are incorporated by reference as if fully set forth.

FIELD OF INVENTION

The present invention is related to a wireless communication system including at least one wireless transmit/receive unit (WTRU), at least one Node-B and a radio network controller (RNC). More particularly, the present invention is related to a method and apparatus for implementing a data lifespan timer for supporting enhanced dedicated channel (E-DCH) transmissions.

BACKGROUND

Methods for improving uplink (UL) coverage, throughput, and transmission latency are currently being investigated in Release 6 of the Third Generation Partnership Project (3GPP). In order to achieve these goals, the Node-B will take over responsibility of scheduling and assigning UL resources to WTRUs. The Node-B can make more efficient decisions and manage UL radio resources on a short-term basis better than an RNC. The RNC still retains coarse overall control of the cell with enhanced uplink (EU) services so that the RNC can perform functions such as call admission control and congestion control.

Hybrid-automatic repeat request (H-ARQ) techniques provide a procedure for generating transmissions and retransmissions with low latency. A primary aspect of H-ARQ techniques is that data received in failed transmissions is soft combined with successive retransmissions to increase the probability of successful reception.

When an H-ARQ scheme and Node-B scheduling of transmissions is used, the time required to successfully transmit data will vary. Applications requiring very low latency transmission can be adversely effected by significantly delayed transmissions. For example, delayed data may be considered to be a failed transmission and end up being unnecessarily retransmitted by the application. Therefore, a mechanism that limits transmission latency is required.

SUMMARY

The present invention is implemented in a wireless communication system which supports E-DCH data transmissions. The wireless communication system includes a wireless transmit/receive unit (WTRU), at least one Node-B and a radio network controller (RNC). The WTRU includes a data buffer, a data lifespan timer, a data retransmission counter, a hybrid-automatic repeat request (H-ARQ) process and a controller. The lifespan timer establishes a lifespan for at least one data block stored in the buffer. The WTRU is configured to (i) periodically determine whether the lifespan timer has expired, (ii) determine whether the data block was previously transmitted, (iii) determine whether the lifespan timer is close to expiration, and (iv) determine whether physical resources have been allocated. If physical resources have not been allocated for a data block associated with a lifespan timer that is close to expiration, the WTRU sends an urgent channel allocation request to the Node-B. If physical resources have been allocated, the data block is prioritized for transmission with respect to other data blocks. The data block is discarded if the lifespan timer expires or if the WTRU receives feedback information indicating that the data block was successfully received by the Node-B.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 2 is a flow diagram of a process for implementing a data lifespan timer in the WTRU of the system of FIG. 1 in accordance with the present invention.

DETAILED DESCRIPTION OF THE PREFERRED EMBODIMENTS

Figure 1:
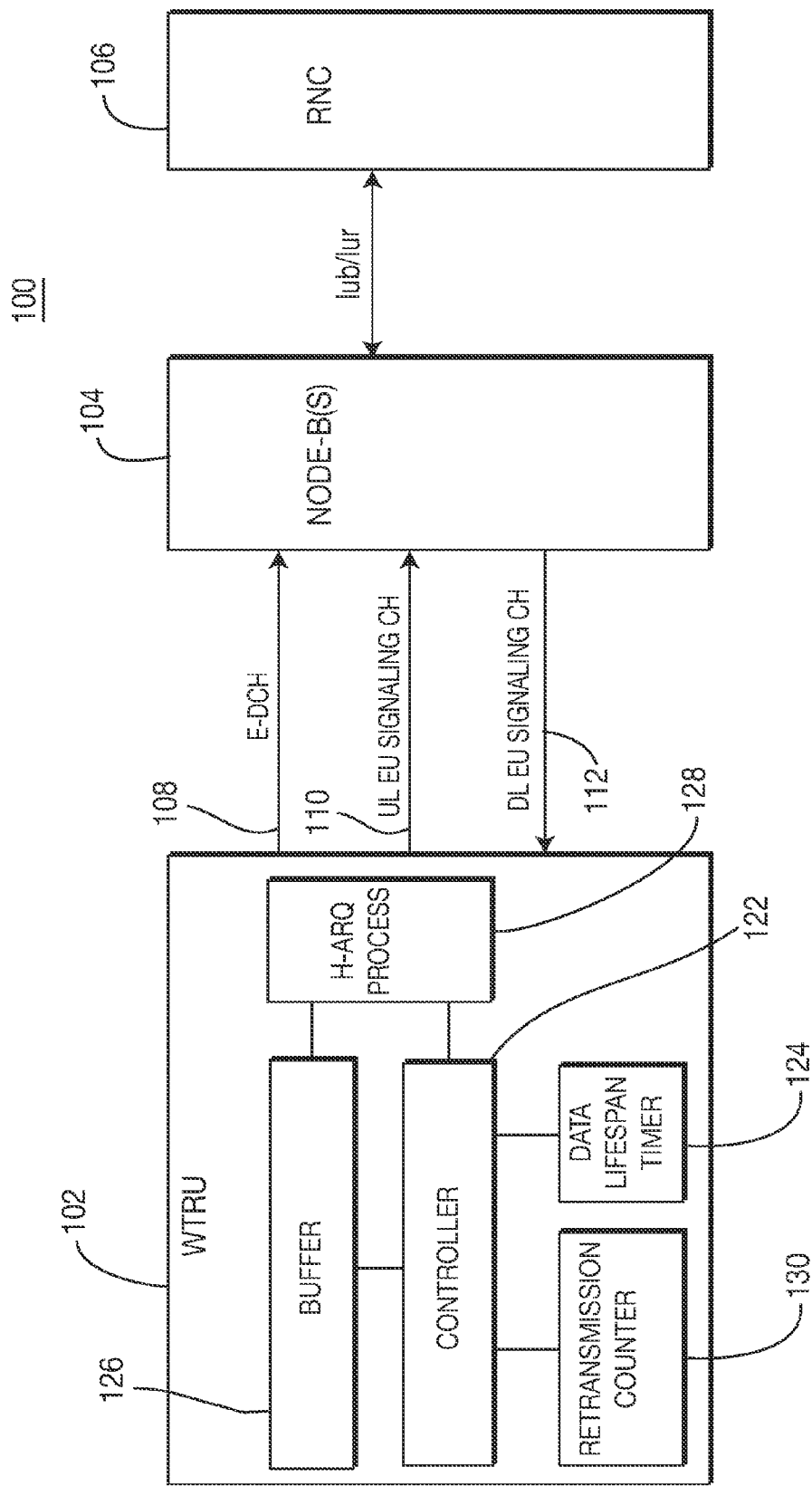
FIG. 1 is a block diagram of a wireless communication system operating in accordance with the present invention.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

FIG. 1 is a block diagram of a wireless communication system 100 in accordance with the present invention. The system 100 comprises at least one WTRU 102, at least one Node-B 104 and at least one RNC 106. The WTRU 102 includes a controller 122, a data lifespan timer 124, a buffer 126, a plurality of H-ARQ processes 128 and optionally a retransmission counter 130. The controller 122 controls overall data transmission procedures including initiation of the data lifespan timer 124 and allocation of an H-ARQ process 128.

The RNC 106 controls overall EU operation of the system 100 by configuring EU parameters for the Node-B 104 and the WTRU 102 such as the lifespan time for transport channel (TrCH) or logical channel data, initial transmit power level, maximum allowed EU transmit power or available channel resources per Node-B 104. E-DCH is established for supporting EU transmissions between the WTRU 102 and the Node-B 104.

For the E-DCH transmissions, the WTRU 102 sends a channel allocation request to the Node-B 104 via a UL EU signaling channel 110. The channel allocation request, (or other UL EU signaling), may be transmitted via the E-DCH 108 instead of the UL EU signaling channel 110. In response, the Node-B 104 sends channel allocation information to the WTRU 102 via a downlink (DL) EU signaling channel 112. After EU radio resources are allocated for the WTRU 102, the WTRU 102 transmits data via an E-DCH 108. In response to the E-DCH data transmission, the Node-B 104 sends an acknowledgement (ACK) or non-acknowledgement (NACK) message for H-ARQ operation via the DL EU signaling channel 112.

FIG. 2 is a flow diagram of a process 200 for implementing a data lifespan timer 124 in the WTRU 102 for supporting E-DCH transmissions in accordance with the present invention. The WTRU 102 may handle multiple E-DCH transmissions simultaneously using a plurality of data lifespan timers 124.

When a new data block is received for transmission via the E-DCH 108, the controller 122 activates a data lifespan timer 124 for the data block, associates an H-ARQ process 128 with the data block and the new data block waits in the buffer 126 (step 202). The RNC configures the data lifespan for each E-DCH TrCH or for each E-DCH logical channel. Upon reception in MAC or RLC for UL transmission the timer is initialized for each transmission.

The value of E-DCH data lifespan timer 124 may be determined by the controller 122 in the WTRU 102 considering several factors such as maximum allowed transmission latency, RLC configuration, and the TrCH block error ratio (BLER) requirement, or the like. For example, the maximum allowed latency determines how long the data can be buffered before delivery. Furthermore, the BLER determines the number of H-ARQ retransmissions which effect transmission latency. The value assigned to the data lifespan timer 124 may also take into account WTRU data processing external to a medium access control entity for EU (MAC-e) in the WTRU 102.

Application protocols, (e.g., TCP/IP), require minimal transmission latency and variance in transmission latency to achieve maximum throughput. When transmission delays occur, data is expected to be failed and discarded, not delayed and retransmitted. This results in an inefficient behavior of the application.

For each TTI at step 204, the controller 122 determines whether the data lifespan timer 124 for the data block in the buffer 126 of the WTRU 102 has expired (step 206). If the data lifespan timer 124 has expired, the controller 122 discards the data block and releases the associated H-ARQ process 128 (step 208). The WTRU 102 may report this event to either the RNC 106 or the Node-B 104 (step 210). The WTRU 102 may further report to the Node-B 104 that physical resources allocations are not sufficient by sending a channel allocation request with a unique indication.

Referring back to step 206, if the data lifespan timer 124 for the data block has not expired, the controller 122 determines whether the data block in the buffer 126 of the WTRU 102 was previously transmitted by the WTRU 102 (step 212). If the data block had been previously transmitted, it is further determined whether data feedback information associated with the data block was received from the Node-B 104 (step 214). If an acknowledgement (ACK) message indicating successful transmission of the data block is received, the data block is discarded from the buffer 126, the associated H-ARQ process 128 becomes available for supporting another data block and the data lifespan timer is reset (step 216). If no feedback message is received, the WTRU 102 waits for the feedback message until the next TTI (step 218).

If, at step 212, it is determined that the data block had not been previously transmitted by the WTRU 102, or that the data block has been transmitted but a non-acknowledgement (NACK) message indicating unsuccessful transmission of the data block is received, the data block is retransmitted. The controller 122 determines whether the data lifespan timer 124 for the data block is close to expiration (step 220).

If the data lifespan timer 124 is not close to expiration, a normal H-ARQ operation is initiated for transmitting the data block (step 222).

In step 224, the controller 122 determines whether physical resources have been allocated when the data lifespan timer 124 is close to expiration (step 224). If physical resources have been allocated, the controller 122 may optionally prioritize transmission of the data block (step 226). If physical resources have not been allocated, the controller 122 may optionally send an urgent channel allocation request to the Node-B for supporting the transmission of the data block (step 228).

Referring back to step 214, if a NACK message has been received, the data block is retransmitted, the controller 122 may determine whether the retransmission counter 130 has reached a maximum retransmission limit (step 230). The retransmission counter 130 is incremented each time the data block is retransmitted, and the maximum retransmission limit is configured by the RNC 106. If the retransmission counter 130 does not reach the maximum retransmission limit, the process 200 proceeds to step 220. If the retransmission counter 130 reaches the maximum retransmission limit, the controller 122 reinitializes the H-ARQ process 128 as long as the data lifespan timer 124 for the data block has not expired (step 232). The retransmission counter 130 is initialized and a new data indicator is incremented to indicate re-initiation of the H-ARQ process 128.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
a controller configured to receive over a downlink signaling channel a first allocation of physical resources for uplink transmission; and
wherein the controller is further configured to receive data of a logical channel;
wherein the controller is further configured, in response to receiving data of a logical channel, to transmit a first block over the first allocated physical resources using a hybrid automatic repeat request (H-ARQ) process;
wherein the controller is further configured in response to transmission of the first block, to initiate a timer;
wherein the controller is further configured in response to an expiration of the timer and not receiving a second allocation of physical resources, to transmit a request for the second allocation of physical resources over an uplink signaling channel;
wherein the controller is further configured in response to the request, to receive the second allocation of physical resources; and
wherein the controller is further configured in response to the second allocation of physical resources to transmit a second block using a H-ARQ process over the second allocated physical resources.

2. The WTRU of claim 1 wherein transmission of the first block is prioritized over transmission of other data.

3. The WTRU of claim 1 wherein the controller is further configured to restart the timer in response to receiving the second allocation of resources for transmission of the second block.

4. A method performed by a wireless transmit/receive unit (WTRU), the method comprising:

receiving over a downlink signaling channel a first allocation of physical resources for uplink transmission;

receiving data of a logical channel;

transmitting a first block over the first allocated physical resources using a hybrid automatic repeat request (H-ARQ) process, in response to receiving data of a logical channel;

in response to transmitting the first block, initiating a timer;

in response to an expiration of the timer and not receiving a second allocation of physical resources, transmitting a request for the second allocation of physical resources over an uplink signaling channel;

in response to the request, receiving the second allocation of physical resources; and in response to the second allocation of physical resources, transmitting a second block using a H-ARQ process over the second allocated physical resources.

5. The method of claim 4 wherein transmitting the first block is prioritized over transmitting other data.

6. The method of claim 4, further comprising restarting the timer in response to receiving the second allocation of resources for transmitting the second block.

\* \* \* \* \*